United States Patent [19]
Kovari et al.

[11] Patent Number: 4,739,652
[45] Date of Patent: Apr. 26, 1988

[54] METHOD OF, AND TUBING AND SUPPORT APPARATUS FOR, ARRANGING A TUBING ASSEMBLY FOR MEASURING PURPOSES

[75] Inventors: Kalman Kovari, Zollikon; Jakob Köppel, Würenlos; Christian Amstad, Oberhasli, all of Switzerland

[73] Assignee: Gesellschaft zur Förderung der industrieorientierten Forschung an den Schweizerischen Hochschulen und weitern Institutionen, Zurich, Switzerland

[21] Appl. No.: 819,374

[22] Filed: Jan. 16, 1986

[30] Foreign Application Priority Data

Jan. 24, 1985 [CH] Switzerland .................. 00 336/85

[51] Int. Cl.⁴ .............................................. E21B 47/00
[52] U.S. Cl. ..................................... 73/151; 166/382
[58] Field of Search .............. 73/151, 784; 166/382, 166/214, 287, 289; 285/141, 317, 308, 319; 33/302

[56] References Cited

U.S. PATENT DOCUMENTS

| | | | |
|---|---|---|---|
| 2,798,559 | 7/1957 | Fredd | 166/214 |
| 3,483,745 | 12/1969 | Üblacker | 73/151 |
| 3,686,942 | 8/1972 | Chatard et al. | 73/151 |
| 4,204,426 | 5/1980 | Patton et al. | 73/151 |
| 4,254,832 | 3/1981 | Patton et al. | 166/332 |
| 4,291,581 | 9/1981 | Jacoby | 73/784 |
| 4,327,590 | 5/1982 | Kovari et al. | 73/784 |
| 4,440,233 | 4/1984 | Baugh et al. | 166/382 |
| 4,643,024 | 2/1987 | Kovari et al. | 73/151 |

FOREIGN PATENT DOCUMENTS

| | | | |
|---|---|---|---|
| 2166582 | 7/1973 | France . | |
| 2549133 | 1/1985 | France . | |
| 2084217 | 4/1982 | United Kingdom . | |
| 0422840 | 9/1974 | U.S.S.R. | 73/784 |
| 0711358 | 1/1980 | U.S.S.R. | 73/784 |

*Primary Examiner*—Stewart J. Levy
*Assistant Examiner*—Kevin D. O'Shea
*Attorney, Agent, or Firm*—Werner W. Kleeman

[57] ABSTRACT

The tubing system comprises a number of measuring stops or surfaces arranged in a predetermined mutual spaced relationship. The spacing is utilized for determining the displacements in the material enclosing the tubing. This displacement is ascertained by a measuring probe introduced into the tubing from the outside. The measuring stops are provided on measuring tube unions or coupling sleeves in order to ensure that displacements in the material can also be transmitted to the measuring stops even in relatively soft material without a stiffening effect of the tubing. The connection between the measuring tube unions or coupling sleeves takes place exclusively through a telescope-type protecting tube insert. A rigid anchoring of the measuring tube unions or coupling sleeves to the inner wall of an accommodating hole or bore hole provided in the material to be investigated takes place through filling collars fastened to the outside of the measuring tube unions or coupling sleeves. These filling collars are filled with cement mortar through a first filling conduit and a first return conduit. A support arrangement maintains the exact position of the measuring stops of the measuring tube unions or coupling sleeves relative to each other during the assembly of the measuring tube until the cement mortar has hardened in the filling collars. Centering heads of the support arrangement are connected with the measuring stops by detachable locking pins.

22 Claims, 3 Drawing Sheets

METHOD OF, AND TUBING AND SUPPORT APPARATUS FOR, ARRANGING A TUBING ASSEMBLY FOR MEASURING PURPOSES

CROSS REFERENCE TO RELATED APPLICATION

This application is related to the commonly assigned, copending U.S. patent application Ser. No. 799,473, filed Nov. 18, 1985, and entitled "METHOD OF, AND MEASURING TUBE AND MEASURING PROBE FOR, MEASURING FLUID PRESSURE IN A SEALED BORE HOLE" now U.S. Pat. No. 4,643,024, granted Feb. 17, 1987.

BACKGROUND OF THE INVENTION

The present invention broadly relates to a new and improved method of assembling a tubing system for measurement or surveying purposes. The present invention also relates to a new and improved construction of measurement tubing for such a tubing system as well as to a new and improved construction of a support apparatus for supporting such a tubing system.

In its more particular aspects, the present invention specifically relates to a new and improved method of assembling tubing for measurement purposes in a bore or bore hole formed or bored in the material to be investigated. The bore or bore hole possesses reference regions for sampling by a measuring probe and which are arranged in uniform spaced relationship. The purpose of the measurement is to ascertain changes or alterations in the material on the basis of a change in the relative position of two neighboring reference regions.

In other words, the method of the present invention is for assembling a tubing system for measurement purposes in a bore hole having an inner wall, the bore hole being formed in a material to be investigated and having regularly spaced zones to be sampled by a measuring probe for ascertaining alterations in the material on the basis of an alteration in relative position between two neighboring reference zones of the regularly spaced reference zones.

The tubing system of the present invention is for measurement purposes in a bore hole.

The support arrangement of the present invention is for a measurement tubing system.

A tubing system of the abovementioned type is known from the U.S. Pat. No. 4,327,590, granted May 4, 1982. This tubing system, for example, is utilized for ascertaining movements in underground or subterranean regions of building construction. The tubing system possesses a considerable linear extension with spacings between the reference regions of, for example, one meter. In their undeformed starting position, the reference areas or regions are intended to possess an exactly predetermined position relative to each other, since the measuring probe should be able to ascertain even very small deviations from this relative position. With known tubing systems therefore, the individually consecutively arranged reference regions are connected with each other by means of a relatively stiff or rigid tube and can also form a component part of such a tube. For transmitting movements due to material displacements to the reference regions of the tubing system, the latter is cemented throughout its entire length into the accommodation or bore hole provided in the material to be investigated. In relatively soft material, i.e., soft rock or ground, satisfactory transmission of the displacing movement to the tubing cannot be ensured due to the fact that in this case, the tubing system behaves too stiffly or rigidly.

SUMMARY OF THE INVENTION

Therefore, with the foregoing in mind, it is a primary object of the present invention to provide a new and improved method of assembling a tubing system for measurement purposes and which does not exhibit the aforementioned drawbacks and shortcomings of the prior art constructions.

A further important object of the present invention aims at providing a method of assembling a tubing system for measurement purposes in a bore or bore hole which is formed or bored in a material to be investigated and which makes possible exact alignment of the reference regions relative to each other without requiring a rigid tubular connection.

Yet a further significant object of the present invention aims at providing a new and improved method of assembling a tubing system of the character described which is relatively simple in concept, economical to perform, reliable in execution and not readily subject to malfunction.

Now in order to implement these and still further objects of the invention, which will become more readily apparent as the description proceeds, the method of assembling a tubing system for measurement purposes of the present invention is manifested by the features that the tubing system is inserted together with an internal or enclosed support arrangement into the bore hole. The support arrangement is detachably connected with the tubing system at the reference regions. The tubing is rigidly anchored to the inner wall of the accommodation hole or bore hole only at its reference regions. The connection between the support arrangement and the tubing system is released after completion of the rigid anchorage and the support arrangement is extracted from the tubing system.

In other words, the method of the present invention is manifested by the features that it comprises the steps of inserting the tubing system together with a support arrangement enclosed in the tubing system into the bore hole, the support arrangement being detachably connected to the reference zones of the tubing system for forming a connection with the tubing system. A rigid anchorage of the tubing system is established exclusively at the reference zones on, and in a wall of, the bore hole. The connection between the support arrangement and the tubing system is released after establishing the rigid anchorage. The support arrangement is subsequently extracted from the tubing system.

As alluded to above, the present invention is not only concerned with the aforementioned method aspects but also relates to a new and improved tubing or tubing system for measurement purposes. Such a tubing system comprises numerous measurement tube unions or coupling sleeves which form reference regions and the tubing system comprises protection tubes which telescopically interconnect the measuring tube unions or coupling sleeves. Each measuring tube union or coupling sleeve is provided with an arrangement or means for rigid anchorage to the inner wall of a bore hole.

In other words, the tubing system of the present invention comprises at least two measurement tube unions defining at least two reference regions, at least one protecting tube member situated between the at least two measurement tube unions, each at least one protecting tube member comprising a telescopic tube member and anchorage means for establishing a rigid anchorage at each measurement tube union of the at least two measurement tube unions.

As further alluded to above, the present invention is not only concerned with the aforementioned method and tubing system aspects, but also relates to a new and improved support apparatus for the tubing or tubing system. This support apparatus possesses centering heads for engaging the measurement tube unions or coupling sleeves of the tubing system and in which means are provided for establishing a detachable form-locking connection or positive engagement with a measurement tube union or coupling sleeve.

In other words, the support arrangement of the present invention comprises a measurement tube union, at least one centering head inserted into the measurement tube union and means for establishing a releasable positive engagement connection with the measurement tube union.

Since, according to the invention, the tubing regions between the reference regions of the tubing system need no longer fulfill the function of ensuring the exact starting or initial positions of the reference regions, it is possible to limit the function of theses tubing regions to keeping the inner space of the tubing system clear. This function ensures that material which crumbles away from the inner wall of the bore or bore hole does not lead to soiling or contamination of the reference regions to be sampled or even to prevention of the introduction of the measuring probe into the tubing system. Thus, the reference regions which, for example, may be constructed as tubing unions or coupling sleeves, can be telescopically interconnected by means of tubular pieces or members which bridge the spacing between the reference regions.

The establishment of a rigid anchorage of the reference regions of the tubing system to the inner wall of the bore or bore hole is advantageously effected in a manner known per se by means of a filling collar which surrounds each reference region. After filling this filling collar with a fluid hardenable filling material, the filling collar bears fixedly against the inner wall of the bore or bore hole.

Such filling collars for tubing assemblies for measurement purposes are generally known from the U.S. Pat. No. 4,192,181, granted Mar. 11, 1980 and U.S. Pat. No. 4,230,180, granted Oct. 28, 1980. However, these known filling collars have the task or function of sealing predetermined regions of a tubing system from each other for individually sampling these regions or of carrying out pressure or temperature measurements therein. Reference regions for geometric measurement or surveying are not provided in these known tubing systems and the filling collars are provided on a continuous and relatively rigid tubing construction.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the apparatus of the tubing system or tubing assembly and the associated support apparatus for measurement purposes has been illustrated therein as is needed to enable one skilled in the art to readily understand the underlying principles and concepts of the present invention. Turning now specifically to the drawings, the tubing system 1 will be seen to comprise a number of measurement tube unions or coupling sleeves 2 which constitute the reference regions of the tubing system 1. These unions or coupling sleeves 2 are assembled in a mutually spaced relationship d and telescopic protecting tube inserts 3 extend between them. The mutually exact alignment of the measurement tube unions or coupling sleeves 2 relative to each other during the assembly of the tubing system 1 takes place with due regard to their mutual spacing d as well as with due regard to their axial alignment. This is achieved by means of a special support arrangement 4.

The assembly of the tubing system 1 together with the support arrangement 4 occurs progressively or incrementally by consecutively joining or uniting the measurement tube unions or coupling sleeves 2 and the protecting tube inserts 3 together with joinable components of the support arrangement 4. The joining or assembly can take place externally to a bore hole 6 formed in a material 5 to be investigated by successively inserting the unit comprising the tubing system 1 and the support arrangement 4 thus formed further into the bore hole 6. At the same time, in accordance with the first exemplary embodiment of FIGS. 1, 4 and 5, correspondingly long portions of a first filling conduit 8 and a first return conduit 9 are assembled or mounted to the measurement tube. This first filling conduit 8 and the first return conduit 9 serve for the later filling of filling collars 10.

The measurement tube unions or coupling sleeves 2 are rigidly fixed to the support arrangement 4 by means of a releasable latching mechanism 14 and 23 during the process of pushing or inserting the tubing system 1 into the bore hole 6. The support arrangement 4 is held in position in order that the measurement tube unions or coupling sleeves 2 can maintain exact mutual alignment until they are anchored to the inner wall 12 of the bore hole 6. The releasable latching mechanism comprises a locking body spring 14 and a pin carrier or latching body 23.

Figure 2:
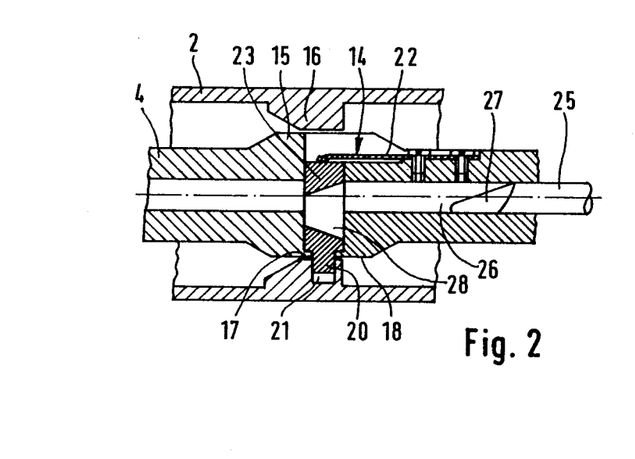
FIG. 2 shows a partial section through the tubing system in accordance with FIG. 1 in the reference region in conjunction with the support arrangement.

For this purpose, the support arrangement 4 possesses a centering head 15 for each measurement tube union or coupling sleeve 2. The centering head 15 is pushed between dog type measurement stops or surfaces 16 which are provided inside the measurement tube unions or coupling sleeves 2. A number of the measurement stops or surfaces 16 are provided next to each other in the direction of the circumference. Their cylindrical inner surfaces 17 thus center the measurement tube union or coupling sleeve 2 on the circularly cylindrical circumferential surface 18 of the centering head 15. The axial fixation of the measurement tube union or coupling sleeve 2 at the centering head 15 of the support arrangement 4 occurs through a locking pin 20 which is latchable in a transverse bore or hole 21 in one of the measurement stops 16, as is shown in the corresponding illustration in FIG. 2. The locking pin 20 is held in the latched position by the pressure of a leaf spring 22 which, with its end, abuts or bears against the pin carrier or latching body 23. This pin carrier or latching body 23 is guided as a transverse slide in the centering head 15.

Figure 3:
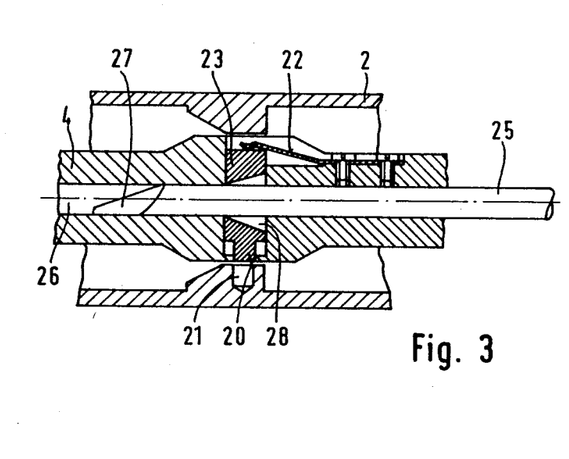
FIG. 3 is a depiction in accordance with FIG. 2 after release of the connection with the support arrangement.

A release member or unlatching rod 25 is provided for releasing the connection between the support arrangement 4 and the measurement tube union or coupling sleeve 2. The release member or unlatching rod 25 is guided along a longitudinal channel 26 of the support arrangement 4. Further, the release member or unlatching rod 25 possesses a nose-shaped tapered or pointed end 27. During the insertion of the release member or unlatching rod 25 into the longitudinal channel 26 this nose-shaped, tapered or pointed end 27 arrives at the transversely displaceable pin carrier or latching body 23 and enters into a tapered opening or hole 28 thereof. This tapered opening or hole 28 is thus transversely displaced relative to the axis of the longitudinal channel 26 in its locked position. When the release member or unlatching rod 25, with its nose-shaped, tapered or pointed end 27, enters the tapered opening or hole 28, it centers this opening or hole 28 with the axis of the longitudinal channel 26 together with a corresponding displacement of the latching body 23 into the unlocking position, as is shown in FIG. 3. It is preferable for the tapered portion of the opening or hole 28 of the pin carrier or latching body 23 to be shaped as a frustum of a cone with a minor diameter corresponding to the diameter of the release member or unlatching rod 25.

By further insertion of the release member or unlatching rod 25 along the longitudinal channel 26, each of the centering heads 15 of the support arrangement 4 can be successively unlatched. This enables the support arrangement 4 to be extracted out of the tubing system or assembly 1 after establishment of a rigid connection of the measurement tube unions or coupling sleeves 2 with the inner wall 12 of the bore or bore hole 6. It is to be understood that various embodiments of a mechanism for producing a releasable connection between the support arrangement 4 and the measurement tube union or coupling sleeves 2 are possible. For instance, an unlatching slide or member can, by means of a tension element, move a pin carrier from the outside into an unlatching position. The unlatching slide or member moves against the force of a tension spring. The loading of the latching means or body 23 by means of the leaf spring 22 which extends in the longitudinal direction of the support arrangement 4 is of advantage due to the small spatial requirements of the leaf spring 22, although other spring constructions are possible.

Figure 1:
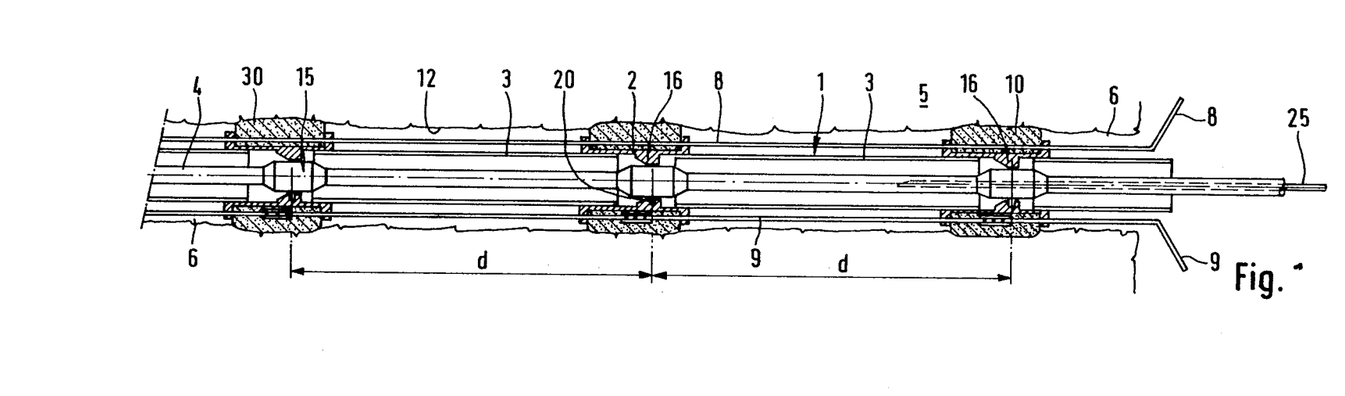
FIG. 1 shows a longitudinal section of a portion of a first exemplary embodiment of a tubing system for measurement purposes in a bore or bore hole after filling the filling collars and with a support arrangement inserted.
Figure 4:
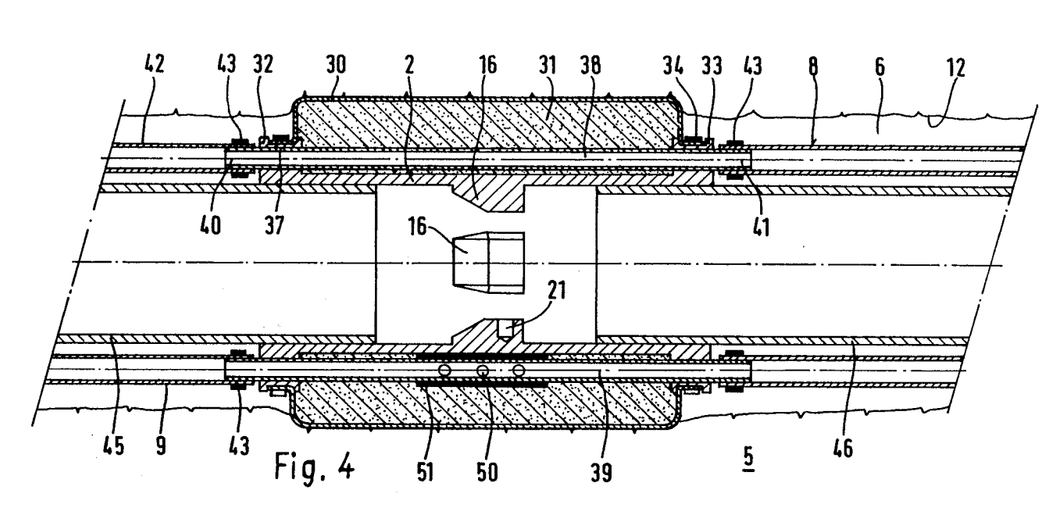
FIG. 4 shows a longitudinal section of a portion of the tubing system in accordance with FIG. 1 in a reference region after removal of the support arrangement.
Figure 5:
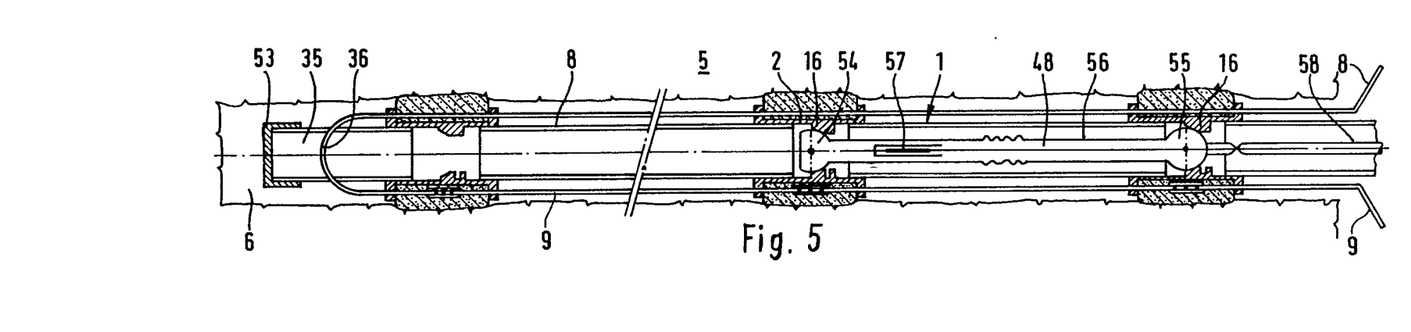
FIG. 5 shows a longitudinal section through the initial and end regions of the tubing system in accordance with FIG. 1 after completion of assembly and with a measuring probe inserted.

In comparison to FIGS. 1 and 5, FIG. 4 shows an enlarged cross-section through a portion of the tubing system 1 in one of the regions of its anchorage in the accommodation or bore hole 6 formed in the material 5. The anchorage is already completed, since the hereinbefore described support arrangement 4 is no longer situated within the tubing system or assembly 1. Correspondingly, cement mortar 31 which is pressed or compacted into a filling collar 30 is already hardened so that a rigid connection between the measurement tube union or coupling sleeve 2 and the inner wall 12 of the bore hole 6 is established.

The components of the measurement tube union or coupling sleeve 2 which are essential elements for the measurement process constitute dog-type measurement stops 16 which are formed on the inner wall thereof. The measurement tube union or coupling sleeve 2 possesses, at each of its ends, a respective flange 32 and 33 extending radially outwards at whose outer circumference an end of the filling collar 30 is clampingly held by means of a hose clamp 34.

In accordance with the depiction in FIG. 5, the first filling conduit or line 8 and the first return conduit or line 9 are interconnected at an inner end region 35 of the tubing system 1 by means of a U-bend 36 and extend through bores or holes 37 in the flanges 32 and 33. For the purpose of facilitating the progressive or incremental assembly of the tubing system 1, pipe spacers or nipples 38 and 39 are preassembled such that they extend parallel to the outer wall of the measurement tube union or coupling sleeve 2 between the flanges 32 and 33 and project or protrude in an axial direction outwardly from the flanges 32 and 33 to form short connection nozzles or ports 40 and 41. In the assembly process, hose pieces 42, constructed for instance of soft plastic or rubber, are respectively pushed-on over such connection nozzles or ports 40 and 41 and are each fastened by means of a hose clamp 43. Thus, the pushed-on hose pieces 42 bridge the space between the neighboring measurement tube unions or coupling sleeves 2. Consequently, they extend parallel to the outer wall of protecting tubes or tube inserts 45 and 46 which telescopically interconnect neighboring measurement tube unions or coupling sleeves 2.

In the progressive or incremental assembly of the tubing system 1, the ends of the protecting tubes or tube inserts 45 and 46 are pushed into a measurement tube union or coupling sleeve 2 such that their outer wall slides along the inner wall of the measurement tube union or coupling sleeve 2. The lengths of the pushed-in protecting tubes or tube inserts 45 and 46 are sufficiently shorter than the space d defined between the dog-type measurement stops 16 of the neighboring measurement tube unions or coupling sleeves 2 by the support arrangement 4 that the protecting tubes 45 and 46 can be prevented from bearing against these measurement stops 16. Thus, the individual measurement tube unions or coupling sleeves 2 can move relative to each other, unhindered by the protecting tubes or tube inserts 45 and 46, should such a movement be imposed on them by the movement to be detected in the material 5 surrounding the bore hole 6. Since the protecting tubes or tube inserts 45 and 46 only have the task or function of keeping the inner space of the tubing system 1 free for the introduction of a measurement probe 48, they may consist of a relatively flexible material or a thin-walled material or a material which is both. This permits transverse offsets arising in the surrounding material 5 to be transmitted undistorted onto the measurement tube unions or coupling sleeves 2.

As opposed to the protecting tubes or tube inserts 45 and 46 and the first filling conduit 8 and the first return conduit 9, the measurement tube unions or coupling sleeves 2 as well as the support arrangement 4 are manufactured of a material, e.g. of a metallic material, which is as stable as possible and that also undergoes no substantial longitudinal changes when subjected to alterations of temperature. A not particularly shown connection between individual members or components of the support arrangement 4, e.g. in the form of a threaded connection, must also be rigidly constructed so that the positions to be calibrated or measured of the measurement tube unions or coupling sleeves 2 or of the dog-type measurement stops or surfaces 16, can always be exactly maintained.

The filling collars 30 comprise a flexible material in order that they can adapt themselves to possible irregularities of the inner wall 12 of the bore hole 6 when subjected to the filling pressure of the cement mortar 31. The material of the filling collars 30 can, for example, be a fabric reinforced plastic. However, it may be advantageous to utilize a permeable or porous fabric for the filling collars 30 whose mesh size is selected such that at the start of the filling process, a small amount of the finest or smallest components of the cement mortar 31 can diffuse through the material, resulting in a mortar connection with the inner wall 12 of the bore hole 6. The filling collars 30 can be pre-formed in cross-sectional shape, as can be seen in FIG. 4, i.e., their connection with the radial flanges 32 and 33 of the measurement tube union or coupling sleeve 2 possesses a smaller diameter. However, they may also comprise a hose material with an outside diameter which is larger than the inside diameter of the bore hole 6 so that the hose clamps 34 close or seal the filling collar 30 at both of its mutually opposite ends upon the outside diameter or surface of the radial flanges 32 and 33. The filling of the filling collars 30 takes place through the first return conduit 9 in that there is situated at least one exit opening 50 in the pipe spacer or nipple 39, which has been pre-mounted in the measurement tube unions or sleeves 2. It is understood that the previously described pipe spacers or nipples 38 and 39 extend through the filling collar 30 due to the fact that the latter is fastened outside of the radial flanges 32 and 33 and thus surrounds the measurement tube union or coupling sleeve 2.

The exit openings 50 of the first return conduit 9 are preferably provided with a valve mechanism in order to prevent a return flow of filler material out of the filling collars 30 into the first return conduit 9. This valve mechanism consists, in a simple manner, of a hose piece 51 made of rubber. The hose piece 51 closely surrounds the first return conduit 9 in the region of the exit openings 50. In the depicted example, three such exit or vent openings 50 are arranged one behind the other in a row extending in a longitudinal direction of the first return conduit 9. The hose piece 51 is lifted up from the first return conduit 9 by a small pressure therein and consequently exposes or opens the exit openings 50. Thus, with the inflow of fluid cement mortar 31 into the first filling conduit 8, the filling collars 30 of the individual measurement tube unions or coupling sleeves 2 start to fill one after another, starting from the inner end of the measurement tube. The filling pressure is maintained until the rigidification or hardening of the cement mortar 31 in the filling collars 30 is complete. It is to be understood that the exit opening 50 can also be provided in the first filling conduit 8 inside the filling collars 30 so that the first return conduit 9 can be dispensed with. However, the utilization of the first return conduit 9 offers greater assurance for a complete filling of all the filling collars 30.

Figure 6:
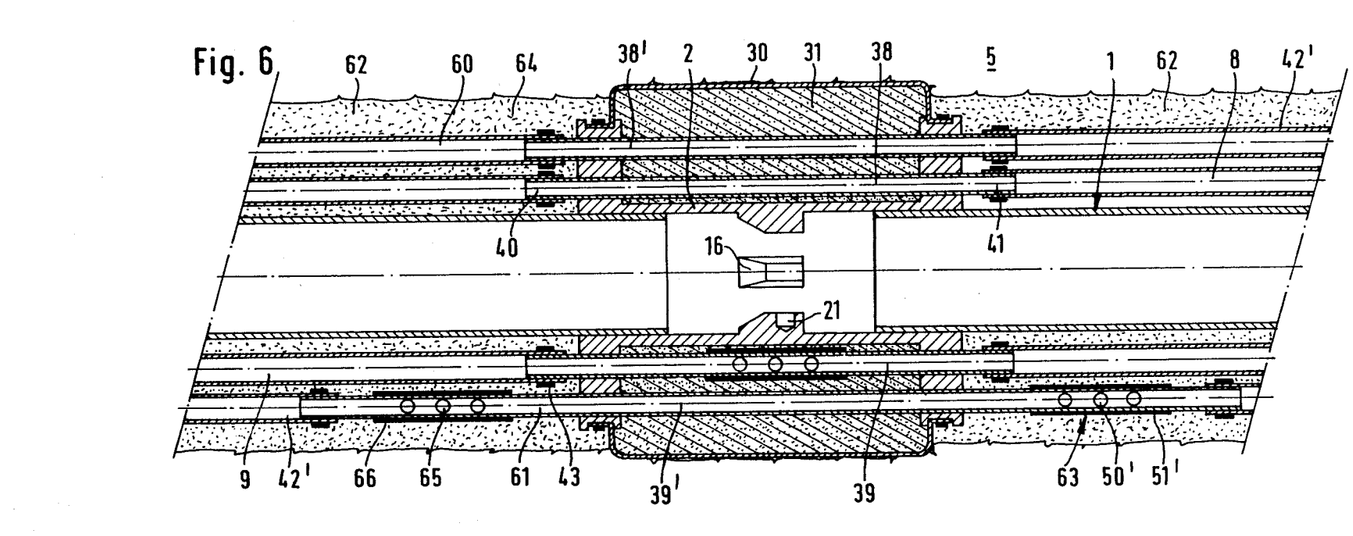
FIG. 6 is a depiction, similar to that shown in FIG. 4, of a second exemplary embodiment of the invention with a second filling conduit.
Figure 7:
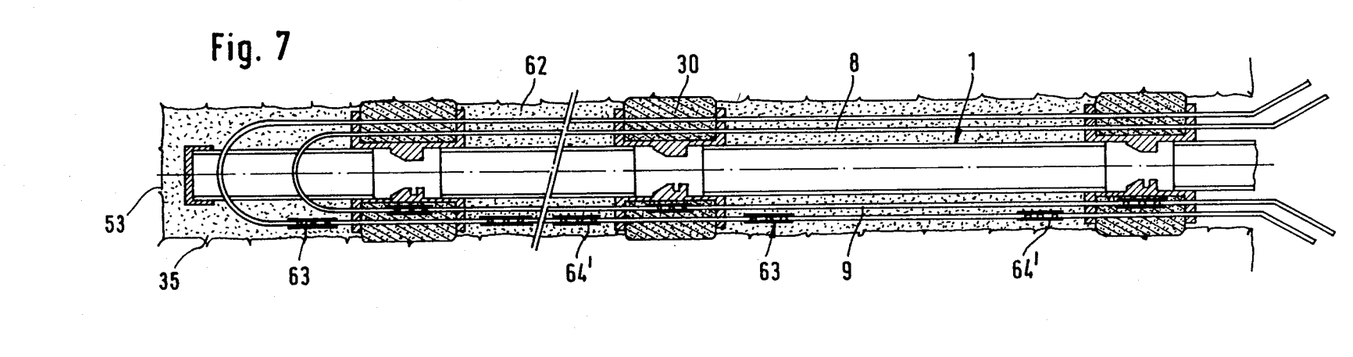
FIG. 7 shows a longitudinal section through the initial and end regions of a tubing system of the second exemplary embodiment with two filling conduits after completion of assembly.

FIGS. 6 and 7 show an exemplary embodiment in which the tubing system or assembly 1 possesses, in addition to the first filling conduit 8 and the first return conduit 9, a second filling conduit 60 and a second return conduit 61 through which the region or space 62 between two consecutive filling collars 30 can be filled. This region or space 62 is filled so that the tubing 1 or its telescopic protecting tubes or tube inserts 45 and 46 and the lines or conduits 60 and 61 can be protected against local overloading caused by the surrounding material 5. The material 64 to be filled into the region or space 62 after the filling of the filling collars 30, should, however, possess a lower strength or elasticity relative to the constitution of the surrounding material 5, in order to avoid any substantial stiffening action of the tubing 1. For example, a mortar of a different quality to that used in the filling collars 30 is suitable for this purpose.

The second return conduit 61 and the second filling conduit 60 can be constructed and assembled essentially the same as the hereinbefore described first filling conduit 8 and the first return conduit 9 with the difference that a filling valve arrangement 63 is situated in the region or space 62. Correspondingly, the second filling conduit 60 and the second return conduit 61 also extend through the filling collars 30 and possess hose pieces 42' which are connected with pipe spacers or nipples 38' and 39'.

In addition to the filling valve arrangement 63 comprising a hose piece 51' covering exit openings 50', there is also provided a further venting valve arrangement 64' in the second return conduit 61 in the region or space 62 between the filling collars 30. This venting valve arrangement 64' is of a similar construction to the filling valve arrangement 63, with the essential difference that openings or holes 65 in the second filling conduit 60 or its second return conduit 61 are covered by means of a fabric collar 66 fastened to the second filling conduit 60 or the second return conduit 61. The fabric of this fabric collar 66 allows air or water or both to escape into the second return conduit 61 from the region or space 62 to be filled without, however, allowing filling material to pass through.

FIGS. 5 and 7 show a tubing system 1 in accordance with the invention including the tubing end or terminal region 35 which is sealingly closed by means of a tube cap 53. The tubing system 1 can possess almost any length, i.e., it can be provided with a large number of consecutive measurement tube unions or coupling sleeves 2. The measuring probe 48 is progressively or incrementally utilized and both its ball-shaped or spherical end heads 54 and 55 are brought into measurement contact with the dog-type measuring stops 16 of two neighboring measurement tube unions or coupling sleeves 2. Both ball-shaped or spherical end heads 54 and 55 are interconnected by means of a torsion-resistant telescopic tube 56. By the exactly defined contact position of the ball-shaped or spherical end heads 54 and 55 against the measuring stops or surfaces 16, it is possible to ascertain any longitudinal or length change arising between these contact positions of neighboring measurement tube unions or coupling sleeves 2 due to a movement occurring in the surrounding material 5. This change is measured by means of a measurement value transmitter 57 which is responsive to longitudinal extension. A not particularly shown electrical connecting line transmits the measured value thus ascertained along an operating rod 58 of the measuring probe 48 to an external evaluating instrument. Such a measurement process is further described in the already mentioned U.S. Pat. No. 4,327,590.

While there are shown and described present preferred embodiments of the invention, it is to be distinctly understood that the invention is not limited thereto, but may be otherwise variously embodied and practiced within the scope of the following claims. Accordingly,

What we claim is:

1. A method of assembling a tubing system for measurent purposes in a bore hole having an inner wall, said bore hole being formed in a material to be investigated, said tubing system having regularly spaced measurement tube unions defining reference zones to be sampled by a measurement probe for ascertaining alterations in said material on the basis of an alteration in the relative position between two neighboring reference zones of said regularly spaced reference zones, comprising the steps of:
   inserting said tubing system together with a support arrangement enclosed in said tubing system into said bore hole;
   said support arrangement being detachably connected to said measurement tube unions for forming a connection with said tubing system;
   establishing a rigid anchorage of said tubing system exclusively at the region of said reference zones defined by said measurement tube unions on an inner wall of aaid bore hole;
   releasing said connection between said support arrangement and said tubing system after establishing said rigid anchorage; and
   extracting said support arrangement from said tubing system.

2. The method as defined in claim 1, wherein:
   said step of establishing said rigid anchorage entails externally fastening a respective filling collar to each said measurement tube union for limiting said rigid anchorage to said reference zones;
   said step of establishing said rigid anchorage further entails filling said filling collars under a filling pressure with a hardening fluid filling material; and
   said step of establishing said rigid anchorage further entails maintaining said filling pressure until said filling material has hardened.

3. The method as defined in claim 2, further comprising the steps of:
   forming a respective initially unfilled space between each two successively arranged regularly spaced filled filling collars and between said tubing system and said inner wall of bore hole;
   filling each of said initially unfilled spaces between each two successiely arranged regularly spaced ones of said filled filling collars and between said tubing system and said inner wall of bore hole with a material of relatively low strength for protecting said tubing system without substantially stiffening said tubing system.

4. A tubing system for measurement purposes in a bore hole formed in a material in order to determine changes in the material of the bore hole, comprising:
   at least two measurement tube unions defining at least two reference zones;
   at least one protecting tube member situated between said at least two measurement tube unions;
   said at least one protecting tube member having two oppositely situated ends;
   each of said oppositely situated ends of said at least one protecting tube member being slidably connected to an adjacent one of said at least two measurement tube unions between which there is situated said at least one protecting tube member; and
   anchorage means for rigidly anchoring said at least two measurement tube unions to an inner wall of said bore hole.

5. The tubing system as defined in claim 4, wherein:
   said anchorage means comprise filling collars.

6. The tubing system as defined in claim 4, further comprising:
   at least one measurement stop situated inside each of said measurement tube unions and possessing a latch depression;
   a support arrangement for supporting said measurement tube unions and comprising a locking pin for engaging in said latch depression; and
   said anchorage means serving for supporting said at least two measurement tube unions and said support arrangement within the bore hole until removal of said support arrangement from the tubing system.

7. The tubing system as defined in claim 5, further comprising:
   a first filling conduit;
   each one of said filling collars surrounding a related one of said at least two measurement tube unions; and
   each said filling collar of said at least two measurement tube unions being interconnected by said first filling conduit.

8. The tubing system as defined in claim 7, further comprising:
   a first return conduit provided for said first filling conduit
   said first return conduit extending through said filling collars and having a wall provided with an exit opening; and
   a valve arrangement provided for said first return conduit for filling each said filling collar.

9. The tubing system as defined in claim 7, wherein:
   each said measurement tube union has a first end and a second end and an end flange at each said first and second ends;
   a respective one of said filling collars being fastened at an outer circumference thereof at each said end flange of said related one of said at least two measurement unions;
   a first return conduit provided for said first filling conduit; and
   said first filling conduit and said first return conduit extending through said end flanges.

10. The tubing system as defined in claim 7, wherein:
    each said filling collar being fillable with a filling material; and each said filling collar comprises a fabric such that a small portion of said filling material can diffuse through said fabric of said filling collar.

11. The tubing system as defined in claim 7, further comprising:
a second filling conduit;
at least one filling valve arrangement cooperating with said second filling conduit; and
said second filling conduit extending through each of said filling collars; and
said at least one filling valve arrangement being provided between each two neighboring ones of said filling collars.

12. The tubing system as defined in claim 11, wherein:
a first return conduit provided for said first filling conduit;
said first return conduit extending through each of said filling collars and having a wall;
a valve arrangement provided for said first return conduit;
said first return conduit being provided with at least one exit opening in said wall for filling each said filling collar; and
said valve arrangement of said first return conduit and said at least one valve arrangement cooperating with said second filling conduit of said tubing system each comprises an elastic hose piece;
said elastic hose piece of said valve arrangement of said first return conduit surrounding said first return conduit and said at least one exit opening thereof;
said second filling conduit being provided with at least one exit opening; and
said elastic hose piece of said at least one valve arrangement cooperating with said second filling conduit surrounding said second filling conduit and said at least one exit opening thereof.

13. The tubing system as defined in claim 11, further comprising:
a second return conduit having a wall and provided for said second filling conduit;
said second return conduit comprises a venting valve arrangement constituted by a fabric collar and defined by said at least one filling valve arrangement;
said second return conduit possessing at least one opening in said wall thereof; and
said fabric collar of said venting valve arrangement covering said at least one opening.

14. The combination of a support arrangement and a measurement tubing system for measurement purposes in a bore hole formed in a material in order to determine changes in the material of the bore hole wherein:
said measurement tubing system comprises:
at least two measurement tube unions defining at least two reference zones;
at least one protecting tube member situated between said at least two measurement tube unions;
said at least one protecting tube member having two oppositely situated ends;
each of said oppositely situated ends of said at least one protecting tube member being slidably connected to an adjacent one of said at least two measurement tube unions beten which there is situated said at least one protecting tube member;
anchorage means for rigidly anchoring said at least two measurement tube unions to an inner wall of said bore hole;

said support arrangement comprising:
at least one respective centering head provided for each measurement tube union for inserting into a related one of said measurement tube unions of said measurement tubing system; and
means for establishing a releasable positive engagement connection between each said centering head and the measurement tube union into which there has been inserted said centering head.

15. The combination as defined in claim 14, further comprising:
a spring situated inside each said centering head;
a release member;
said means for establishing said releasable positive engagement connection between each said centering head and the measurement tube union into which there has been inserted said centering head comprising a locking body;
each said locking body comprising a locking pin and a latching body; and
said means for establishing said releasable positive engagement connection between each said centering head and the measurement tube union into which there has been inserted said centering head being loaded by said spring and being movable into an unlocking position against the force of said spring by means of said release member from an outer end of said support arrangement.

16. The combination as defined in claim 15, wherein:
said release member comprises an unlatching rod.

17. The combination as defined in claim 15, wherein:
said support arrangement possesses a longitudinal channel;
said release member being movably advanceable inside said longitudinal channel;
said latching body of said locking body being transversely displaceably guided in said centering head of said support arrangement; and
said latching body possessing an opening for inserting said unlatching rod and upon which a control surface extends at an angle subtended relative to the longitudinal axis of said unlatching rod.

18. The combination as defined in claim 17, wherein:
said control surface comprising a frustro-conical limiting surface of said opening.

19. A support arrangement for a measurement tubing system for measurement purposes in a bore hole formed in a material in order to determine changes in the material of the bore hole, said measurement tubing system including a measurement tube union, comprising:
at least one centering head for inserting into the measurement tube union of said measurement tubing system;
means for establishing a releasable positive engagement connection of said at least one centering head with said measurement tube union;
a spring situated inside said at least one centering head;
a release member;
said means for establishing said releasable positive engagement connection of said at least one centering head with said measurement tube union comprising a locking body;
said locking body comprising a locking pin and a latching body; and
said means for establishing said releasable positive engagement connection of said at least one centering head with said measurement tube union being loaded by said spring and being movable into an unlocking position against the force of said spring by means of said release member from an outer end of said support arrangement.

20. The support arrangement as defined in claim 19, wherein:

said release member comprises an unlatching rod.

21. The support arrangement as defined in claim 19, wherein:

said support arrangement possesses a longitudinal channel;

said release member being movably advanceable inside said longitudinal channel;

said latching body of said locking body being transversely displaceably guided in said at least one centering head of said support arrangement; and said latching body possessing an opening for inserting said unlatching rod and upon which a control surface extends at an angle subtended relative to the longitudinal axis of said unlatching rod.

22. The support arrangement as defined in claim 21, wherein:

said control surface comprising a frustro-conical limiting surface of said opening.

* * * * *